(12) United States Patent
Kitazawa

(10) Patent No.: US 7,239,040 B2
(45) Date of Patent: Jul. 3, 2007

(54) METHOD AND APPARATUS FOR RELEASING BRAKE INTERLOCK FUNCTION FOR VEHICLE AUDIO/VIDEO DISPLAY UNIT

(75) Inventor: Akitoshi Kitazawa, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 441 days.

(21) Appl. No.: 10/627,025

(22) Filed: Jul. 25, 2003

(65) Prior Publication Data

US 2005/0023899 A1    Feb. 3, 2005

(51) Int. Cl.
   *B60L 1/00*   (2006.01)
(52) U.S. Cl. .................. 307/10.1; 307/328; 297/217.3
(58) Field of Classification Search ............... 307/9.1, 307/10.1, 328; 297/217.4, 217.3; 701/36, 701/211; 348/61; 340/461, 462
   See application file for complete search history.

(56) References Cited

U.S. PATENT DOCUMENTS

| | | | | |
|---|---|---|---|---|
| 5,191,312 A | * | 3/1993 | Altmann et al. ............ | 340/441 |
| 5,541,572 A | * | 7/1996 | Okamoto et al. ........... | 340/438 |
| 6,029,110 A | * | 2/2000 | Zuber et al. ................ | 701/200 |
| 6,351,705 B1 | * | 2/2002 | Yoshioka ..................... | 701/200 |
| 2002/0105507 A1 | | 8/2002 | Tranchina et al. | |
| 2002/0175564 A1 | * | 11/2002 | Tengler et al. .............. | 307/9.1 |
| 2003/0007227 A1 | * | 1/2003 | Ogino ........................ | 359/227 |
| 2004/0007906 A1 | * | 1/2004 | Park et al. ................ | 297/217.3 |
| 2004/0121645 A1 | * | 6/2004 | Postrel ........................ | 439/374 |

FOREIGN PATENT DOCUMENTS

| | | | |
|---|---|---|---|
| JP | 02124683 A | * | 5/1990 |
| JP | 10116086 A | * | 5/1998 |

* cited by examiner

*Primary Examiner*—Chau N. Nguyen
*Assistant Examiner*—Daniel Cavallari
(74) *Attorney, Agent, or Firm*—Muramatsu & Associates

(57) ABSTRACT

A method and apparatus for easily and safely releasing a brake interlock function of a vehicle audio/video system. The vehicle audio/video system is designed to enable both a driver and a passenger to watch a video with a display unit. For safety reasons, a brake interlock function is incorporated to disable the display unit when the vehicle is in motion. The brake interlock function is released if the display unit is installed for passengers in the rear seats. Various release devices including a mechanical and an electrical switch are disclosed for releasing the brake interlock function for the display unit in the vehicle audio/video system. The release device is established within a display compartment mounted on a front or middle seat when the display unit is installed in the display compartment.

18 Claims, 11 Drawing Sheets

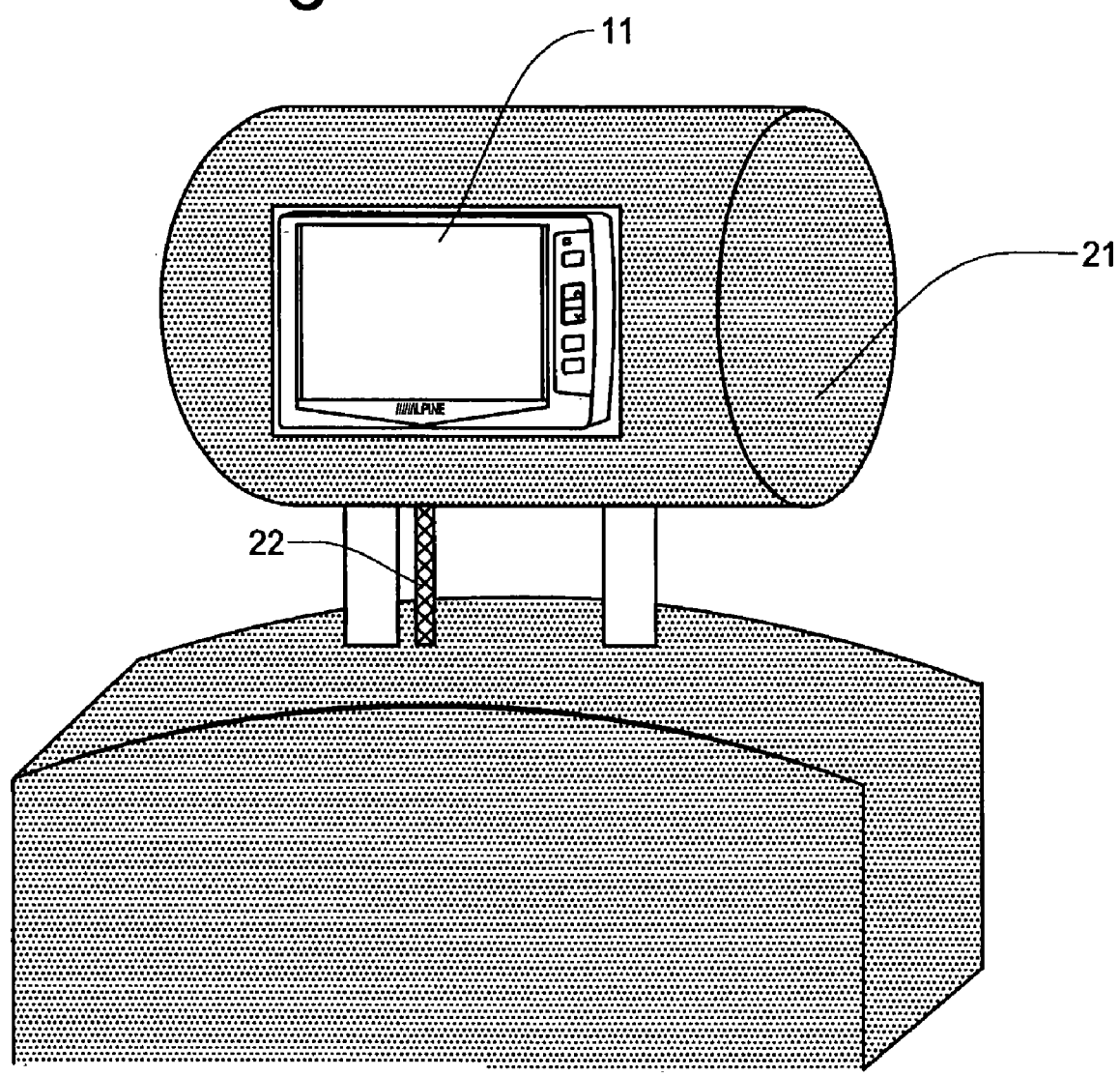

METHOD AND APPARATUS FOR RELEASING BRAKE INTERLOCK FUNCTION FOR VEHICLE AUDIO/VIDEO DISPLAY UNIT

FIELD OF THE INVENTION

This invention relates to a vehicle audio/video system with a display unit having a brake interlock function, and more particularly, to a method and apparatus which safely and easily release a brake interlock function of the audio/video system, thereby enabling a display unit in a vehicle to display video images.

BACKGROUND OF THE INVENTION

Vehicles have been normally equipped with a radio, a cassette player or a CD (Compact Disk) player and speakers. Recently, more and more people want to equip with not only such audio equipment but also video equipment since they tend to enjoy movies or TV shows in their vehicles just like in their homes. Such a vehicle audio/video system typically includes a TV tuner, a VCR or a DVD (Digital Versatile Disc or Digital Video Disc) player and monitor screen for displaying video images. In a more sophisticated audio/video system, a navigation system is incorporated to provide both audio sound and video images as well as a route guidance function to guide a user to his/her destination.

FIG. 1 shows a typical example of audio/video system when it is installed in a dashboard 12 of a vehicle (the front passenger side is not shown). The audio/video system includes a display unit 11 which is normally placed about the center of the dashboard 12 and a DVD player 13 which may also include a TV tuner. If a navigation system is installed in the vehicle, the display unit 11 also functions as a monitor screen for the navigation system, and a driver is always allowed to watch the navigation status on the display unit.

However, because of the safety reason, while the vehicle is moving, the driver is not allowed by law to watch a movie, a TV program, a video game or any other moving images (hereafter "video") which may distract the driver except for the navigation message or vehicle information. Namely, current traffic regulations for safe driving prohibit the display unit 11 from playing the video within the driver's view when the vehicle is in motion. To comply with this rule, a typical audio/video system includes an interlock function to disable a display unit under predetermined conditions. Such an interlock function checks the status of a footbrake and a handbrake (parking brake) to disable any video display unit. This feature is sometimes called a "brake interlock function", the details of which will be described later.

FIG. 2A shows an example of the display unit 11 installed in the rear of a headrest 21 of a front seat or a middle seat. An interface cable 22 connects the display unit 11 and the DVD player 13 (or AV interface unit 47 shown in FIG. 4A). FIG. 2B shows another example of the display unit 11 which is installed in the rear of a seat 23 (front or a middle seat). Passengers in the rear seats or middle seats are always allowed to watch a video, since it will not directly affect the safe driving. Therefore, the brake interlock function for a display unit for rear seat passengers is not required but is required only for a display unit for a driver.

There are several types of audio/video system. The first type is an audio/video system only for a driver. As mentioned before, the brake interlock system is required for this type of system. The second type is an audio-video system only for passengers in the rear seats. This type needs not be controlled like the first one because passengers in middle seats or rear seats are always allowed to watch the video. Thus, the brake interlock function for the display unit is not required.

The third one is an audio/video system for both a driver and passengers, to which the present invention is advantageously applied. For this type, the brake interlock system is only required when a display unit is installed in the dashboard for a driver. On the other hand, the display unit should not be disabled when the display unit is installed for passengers in the rear seat or middle seat. This type of the audio/video system is preferable in terms of design and production cost because the same components such as display units can be used for a driver (front seat) and passengers (rear seat) except for the feature of the brake interlock function.

However, if a display unit can be used commonly for a driver's seat and rear passenger's seat, a vehicle must have a brake interlock function to disable the display unit for the driver when the vehicle is in motion. In contrast, when the display unit is installed for passengers in the rear or middle seats, such a brake interlock function should be released. In other words, the common display unit with the brake interlock function can be used for both a driver and a passenger if the audio/video system has a feature to release the brake interlock function when the display unit is installed for rear passengers.

FIG. 3 shows an example of the display unit 11 which can be used for both a driver and a passenger. Typically, the display unit 11 has a color LCD (Liquid Crystal Display) panel (screen) 11a. The display unit 11 has various buttons such as a power switch 11b, a volume up button 11c and a volume down button 11d, a select button 11e, and a display key 11f. For example, the volume up button 11c and down button 11d are used to adjust the sound volume or to adjust an image such as brightness, and the select button 11e is used to select an input source or a function for the display unit 11. The display button 11f is used to select a display mode such as "wide" or "normal" of the screen 11a. The display unit 11 is used either as a video screen or navigation screen. Namely, the select button 11e is used to choose an input source, a video from audio/video source such as a DVD or navigation data from the navigation system.

A wire 47a for releasing the brake interlock function comes with the display unit 11 when an end user purchases the display unit 11. The wire 47a is used only when the display unit 11 is installed at locations other than the front seat. In the case where the display unit is installed for rear seat passengers, the wire 47a is connected by a technician of a dealer to release the brake interlock function. Such a releasing procedure is done in accordance with instructions provided by a manufacturer of the audio/video display system. In other words, the user has to go to the dealer to activate the display unit for rear seat passengers.

FIG. 4A is an example of conventional audio/video system with the brake interlock function which can be used for both a driver (front seat) and a passenger (rear seat). In this example, the audio/video system is comprised of a display unit 11, a footbrake 44, a handbrake 45, an AV interface unit 47, a video source unit such as a DVD player 46, and a navigation system 48. Depending on the design of the system, the AV interface unit 47 may be formed within the housing of the display unit 11. The video source unit can be a TV tuner or a video game player instead of the DVD player

46. It is assumed that when two or more display units 11 are used, two or more AV interface units 47 will be provided corresponding to the display units so that each pair of display unit and AV interface unit can operate independently from one another.

In this example, both audio and video signals are sent from the DVD player 46 to the display unit 11 through the AV interface unit 47. The navigation data is also sent to the display unit 11 from the navigation system 48 through the AV interface unit 47. The display unit 11 has the select button 11e (FIG. 3) to select either a video screen or a navigation screen.

The AV interface unit 47 controls the brake interlock function in the audio/video system. The AV interface unit 47 monitors ON/OFF status of the footbrake 44 and the handbrake 45, and controls the display unit 11 to prohibit a driver from operating the DVD player or watching a video when the vehicle is running. Typically, the display unit 11 is designed to be used for both a passenger and a driver. If the display unit 11 is installed for a rear seat passenger, the brake interlock function must be released as noted above.

Also noted above, the wire 47a is used for releasing the brake interlock function. For example, the wire end is connected to the ground to release the brake interlock function. As a result, the AV interface unit 47 stops interlocking the DVD player 46 or display unit 11, allowing the passengers to watch the video when the vehicle is in motion.

Timing chart of FIG. 4B shows an example of brake interlock function as to how the display unit 11 is disabled or enabled in accordance with ON/OFF states of the foot brake and hand brake. In FIG. 4B, "Foot Brake ON" indicates that the footbrake is pressed, and "Foot Brake OFF" indicates that the footbrake is released. Further, "Hand Brake ON" indicates that the parking brake (handbrake) is used, and "Hand Brake OFF" indicates that the parking brake is released. "Display" indicates that the display unit 11 is either allowed or inhibited.

Suppose the vehicle is in motion, the display unit 11 is disabled (status 43a). The display unit 11 can be activated only when the vehicle is stationary. To show that the vehicle is in the stationary state, a driver must do the following steps. First, the driver presses the footbrake (status 41a) until the vehicle stops. Second, in the condition of pressing the footbrake, the driver activates the handbrake (status 42a) after the vehicle stops completely. Third, still in the condition of pressing the footbrake, the driver releases the handbrake (status 42b) and activates the handbrake again (status 42c). Fourth, the driver releases the footbrake (status 41b).

After all the above procedures of the footbrake and the handbrake, the brake interlock function is released (status 43b), thereby enabling the display unit 11. During this procedure, if the handbrake is released (status 42d), the display unit is disabled again (status 43c). The display unit is disabled without regard to whether the footbrake is activated or not (status 41c). If the handbrake is activated again, the display unit 11 is activated (status 43d).

Such a brake interlock function described above must be released when the display unit is used in the rear seat. To do this in the conventional technology, a user has to drive a car to a dealer to release this function. This is burdensome and time consuming to the user. Further, even if the law prohibits, a user may illegally use the wire to release the brake interlock function when the display unit is installed in the front seat. Therefore, it is necessary to establish a new method which can solve the above noted problems.

SUMMARY OF THE INVENTION

It is, therefore, an object of the present invention to provide a method and apparatus for a vehicle audio/video system which is able to easily and securely release a brake interlock function when the display unit is installed only for middle or rear seat passengers.

It is another object of the present invention to provide a method and apparatus for a vehicle audio/video system for releasing the brake interlock function easily by a user without violating the traffic laws.

It is a further object of the present invention to provide a method and apparatus for a vehicle audio/video system which enables a user to easily install the display unit while easily releasing the brake interlock function for the display unit.

In this invention, the vehicle audio/video system is designed to enable both a driver and a passenger to watch a video using the same car audio video system. Thus, the brake interlock function is incorporated in the vehicle in accordance with the traffic regulation if a display unit has to be installed in the dashboard of the vehicle. On the other hand, the brake interlock function should be released if a display unit is installed, for example, in the rear of the seat for rear seat passengers. Various methods and structures for releasing the brake interlock function are described in the present invention.

One aspect of the present invention is an apparatus for releasing a brake interlock function of a vehicle audio/video system. The apparatus includes a display unit for the vehicle audio/video system for displaying images, a display compartment for receiving the display unit therein, and a release device attached to the display unit and the display compartment for producing a release signal when the display unit is installed in the display compartment. The brake interlock function disables the display unit (except for the navigation function) when the display unit is mounted on a dashboard of the vehicle and when the vehicle is in motion, while the brake interlock function is released by the release signal when the display compartment having the display unit is mounted on a rear of a front or middle seat, thereby enabling the display unit.

The rear of the front or middle seat is a rear of a headrest of the front or middle seat of the vehicle wherein the display compartment is so configured to be fit solely with a recess formed on the rear of the headrest. Alternatively, the rear of the front or middle seat is a rear of a seat back of the front or middle seat of the vehicle wherein the display compartment is so configured to be fit solely with a recess formed on the seat back of the front or middle seat.

An example of the release device is a mechanical switch which is pressed by an inner wall of the display compartment when the display unit is installed in the display compartment, thereby generating the release signal. Another example of the release device is a mechanical switch which works as a connector where a pin of the connector is inserted in a receptacle of the connector when the display unit is installed in the display compartment, thereby generating the release signal. A further example of the release device is a mechanical switch comprised of two electrical terminals and a rod for electrically shorting the two terminals when the display unit is installed in the display compartment, thereby generating the release signal, where the two terminals are provided on the display unit, and the rod is placed on an inner wall of the display compartment, or vice versa.

A further example of the release device is comprised of a magnetic sensor and a permanent magnet, and the magnetic sensor detects a magnetic field produced by the permanent magnet when the display unit is installed in the display compartment, thereby generating the release signal, where the magnetic sensor is provided on the display unit and the permanent magnet is provided on an inner wall of the display compartment, or vice versa. A further example of the release device is comprised of an optical sensor and an optical source, and the optical sensor detects light energy produced by the optical source when the display unit is installed in the display compartment, thereby generating the release signal, where the optical sensor is provided on the display unit and the optical source is provided on an inner wall of the display compartment, or vice versa.

Another aspect of the present invention is a method for releasing a brake interlock function of a vehicle audio/video system. The method includes the steps of providing a display unit for the vehicle audio/video system for displaying images, receiving the display unit in a display compartment, producing a release signal by a release device attached to the display unit and the display compartment when the display unit is received in the display compartment, and mounting the display compartment having the display unit on a rear of a front seat or middle seat of the vehicle. The brake interlock function disables the display unit when the display unit is mounted on a dashboard of the vehicle and when the vehicle is in motion while the brake interlock function is released by the release signal when the display compartment having the display unit is mounted on the rear of the seat, thereby enabling the display unit.

According to the present invention, in any embodiments for releasing the brake interlock function, the conventional accessary cable is not used. Moreover, a user can easily install the display unit in the rear of the front seat for passengers in the rear seat and the brake interlock function is automatically released by the installation of the display unit. Since the display compartment for receiving the display unit therein is designed only for the attachment to the rear of the front seat, the user can release the brake interlock function without violating the traffic regulations.

BRIEF DESCRIPTION OF THE DRAWINGS

FIG. 2A is a schematic diagram showing an example of a display unit installed in a headrest.

DETAILED DESCRIPTION OF THE INVENTION

Figure 1:
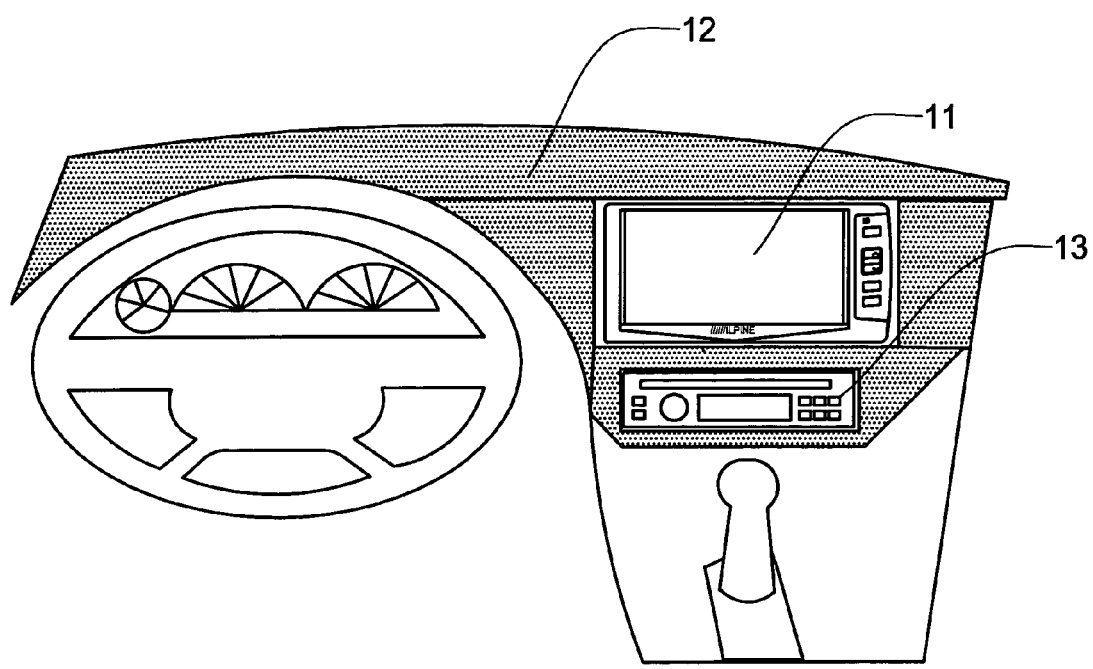
FIG. 1 is a schematic diagram showing an example of audio/video system having a display unit and a DVD player which is mounted on a dashboard of a vehicle.
Figure 2B:
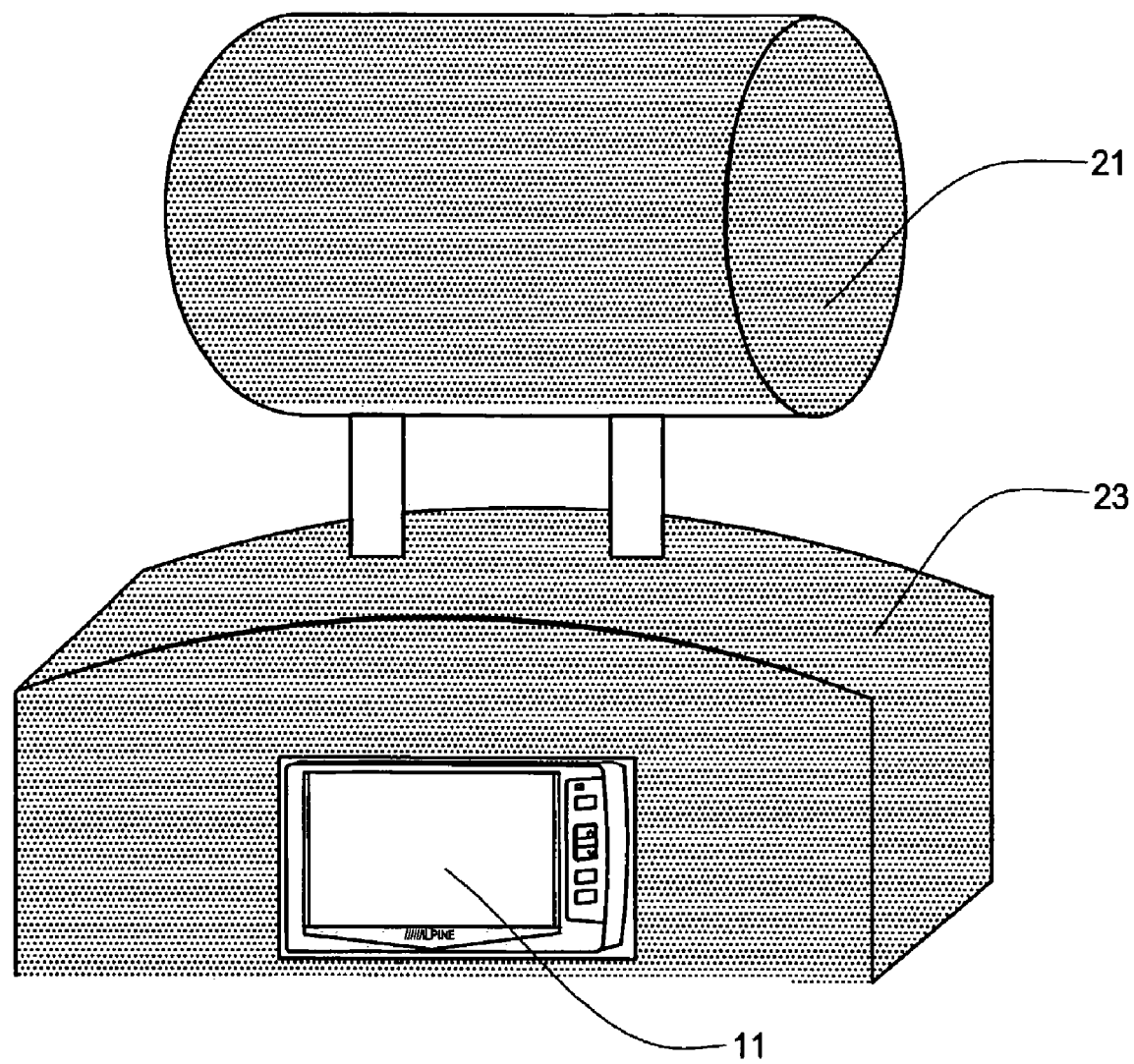
FIG. 2B is a schematic diagram showing an example of a display unit installed in a rear of the seat back.
Figure 3:
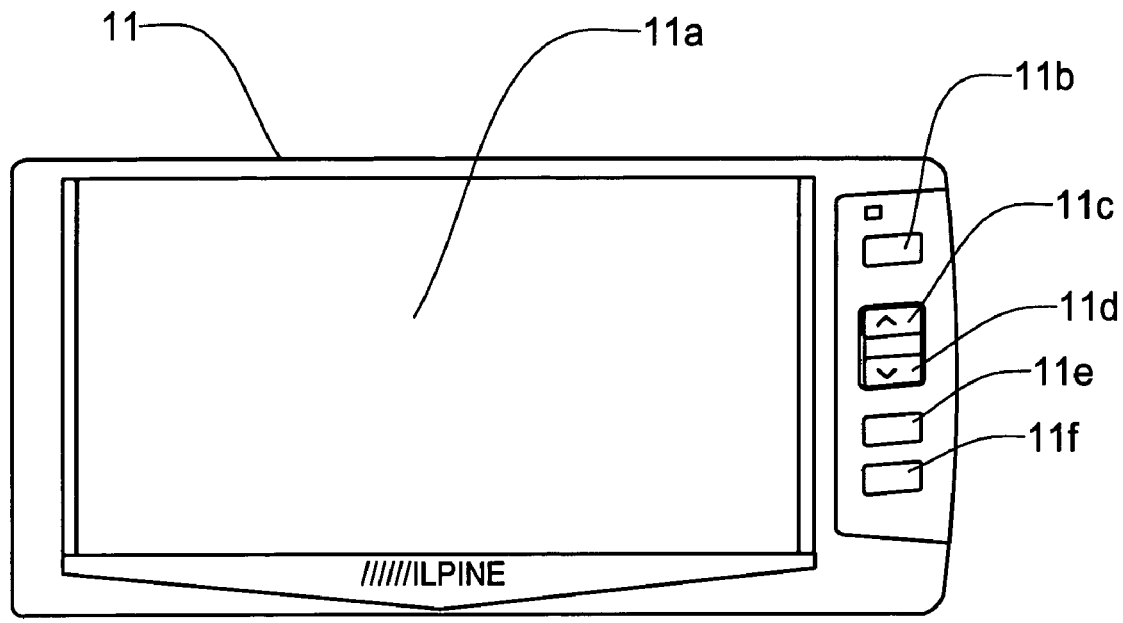
FIG. 3 is a schematic diagram showing an example of display unit for a vehicle audio/video system.
Figure 3:
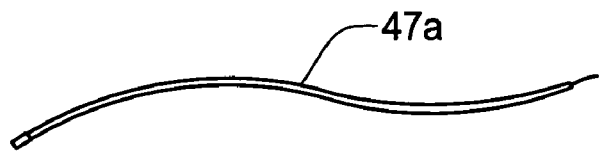

The method and apparatus for releasing the brake interlock function in the present invention is described with reference to FIGS. 5A-9B. Throughout the embodiments shown in FIGS. 5A-9B, a display unit 11 is installed on a rear of a headrest 21, although the present invention is not limited to such specific examples. The display unit 11 can be installed in other locations such as on a rear of a seat back such as shown in FIG. 2B.

Figure 5A:
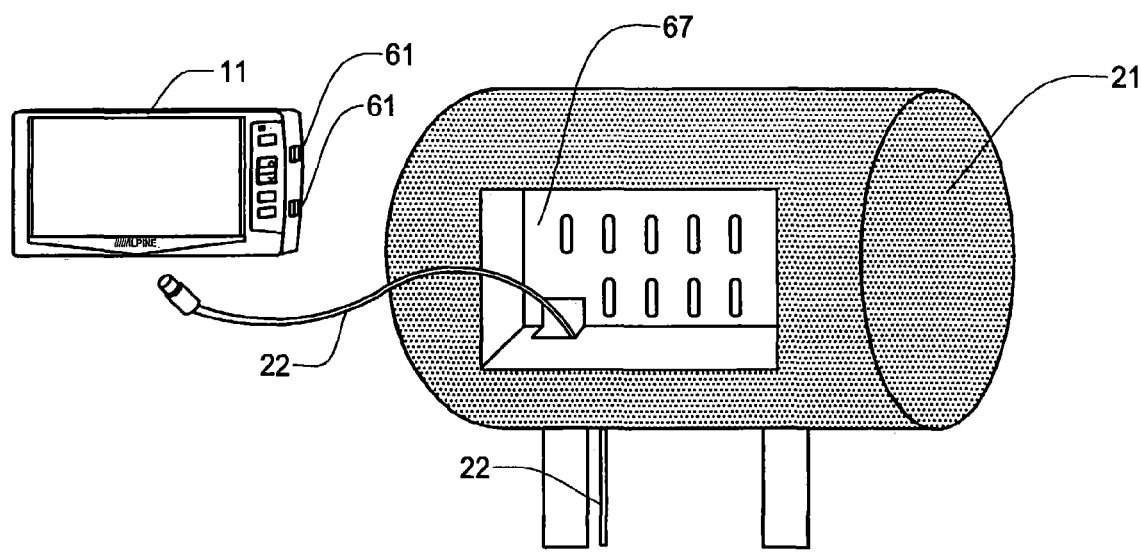
FIGS. 5A-5B are schematic diagrams showing a first embodiment of the present invention where a mechanical switch is installed to release the brake interlock function.
Figure 5B:
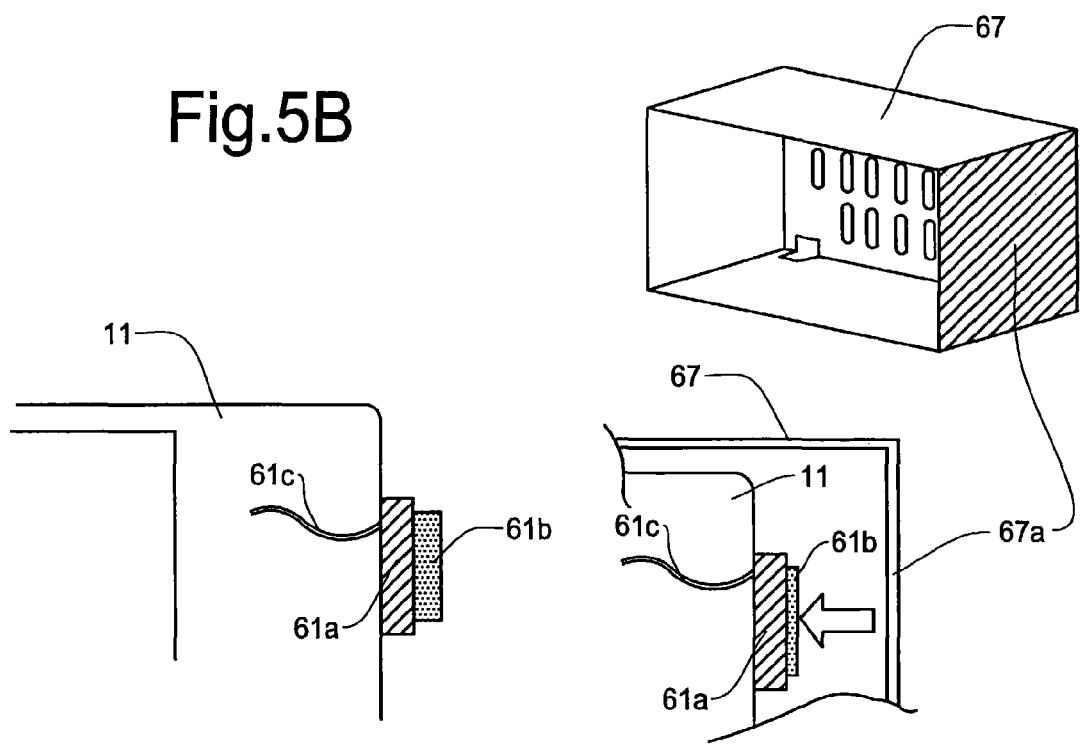

The first embodiment is shown in FIGS. 5a and 5B which utilizes a mechanical switch to release the drive interlock function. FIG. 5A shows an example of location of the mechanical switches in this embodiment. FIG. 5B shows how the mechanical switch works when a display unit 11 is installed in a display compartment 67 which is sometimes called a "headrest cup" when it is installed in a headrest. The display compartment 67 is so designed that it cannot be installed with the display unit 11 in a dashboard of the vehicle. Namely, the display compartment 67 itself is a part of the apparatus of the present invention for releasing the brake interlock function.

Referring back to FIG. 5A, in the first embodiment, mechanical switches 61 are provided on the side panel on the right of the display unit 11. To install the display unit 11 in the headrest 21, the display compartment (headrest cup) 67, which is a part of installation kit, is used. Before installing the display unit 11 in the headrest 21, a recess (hollow) is formed on the headrest 21 to create the display compartment 67 to receive the display unit 11 therein.

In the example of FIG. 5B, each mechanical switch 61 is formed of a switch base 61a, a switch head 61b and a switch wire 61c. Typically, the switch head 61b is biased outwardly with a spring. An inner conductive terminal in the switch base 61a is electrically shorted (ON) when the switch head 61b is pressed inwardly. The inner conductive terminal is electrically open (OFF) unless the switch head 61 is pressed inwardly. Such ON/OFF state is transmitted through the switch wire 61c.

Figure 4A:
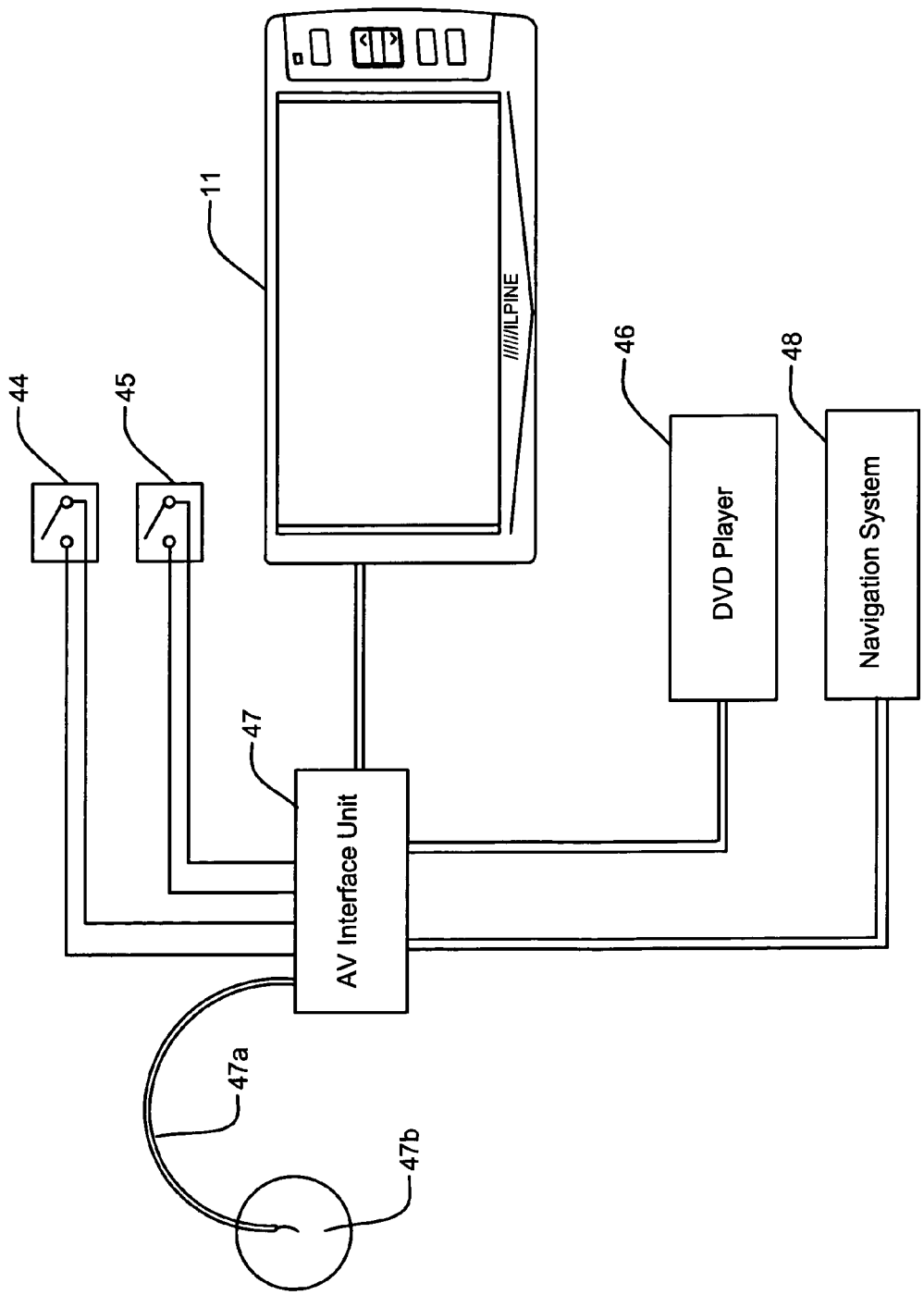
FIG. 4A is a schematic diagram showing a typical car audio/video system in the conventional technology.
Figure 4B:
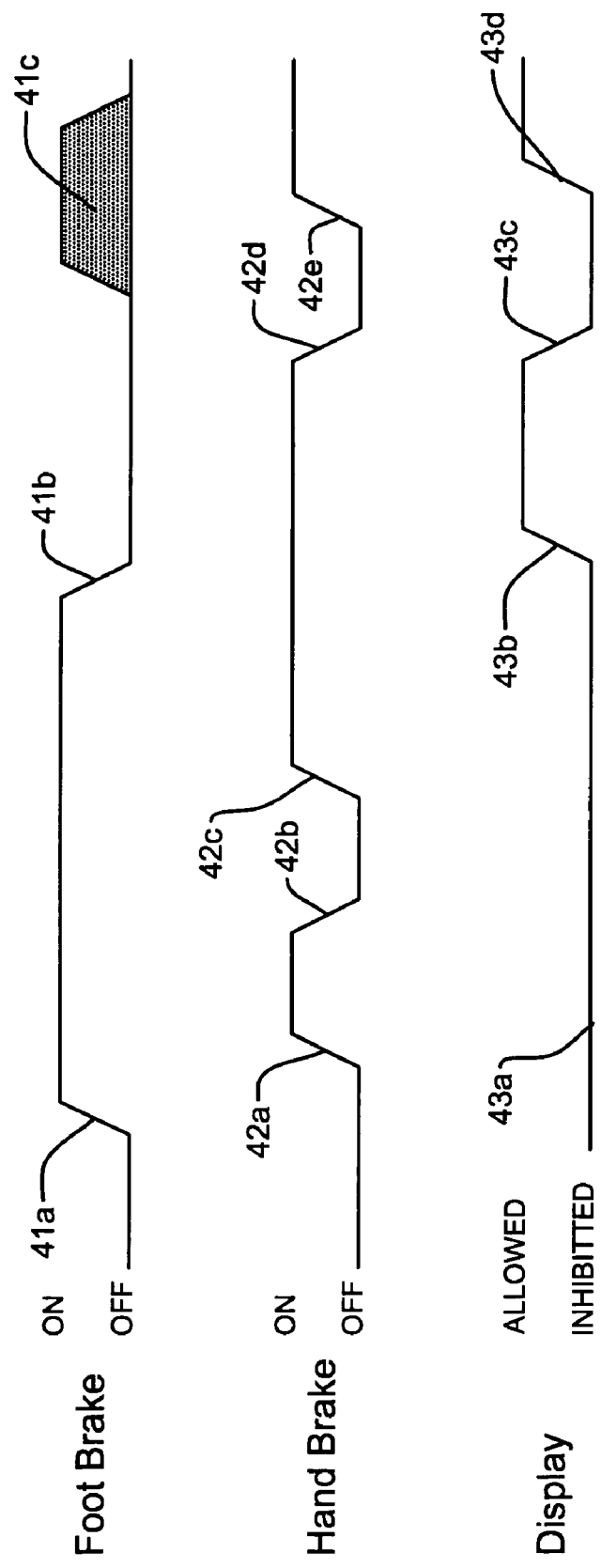
FIG. 4B is a timing diagram showing an example of operation of the brake interlock function.

FIG. 5B shows front views of the switch 61 and the display compartment 67. FIG. 5B also includes a perspective view of the display compartment 67. When the display unit 11 is installed in the display compartment 67, the switch head 61b is pushed inwardly by the side panel 67a, which turns the switch 61 to the ON state. Thus, a signal indicating the ON state is sent to the display unit 11 through the switch wire 61c. As a result, the display unit 11 generates a release signal which is sent to the AV interface unit 47 (FIG. 4A) in order to release the brake interlock function. A cable 22 is to transmit the audio/video signal to the display unit 11 as well as to send the release signal to the AV interface unit 47. Since this method does not use any accessary such as the wire 47a and wire end 47b in the conventional method as shown in FIG. 4A, no illegal installation is possible.

Figure 6A:
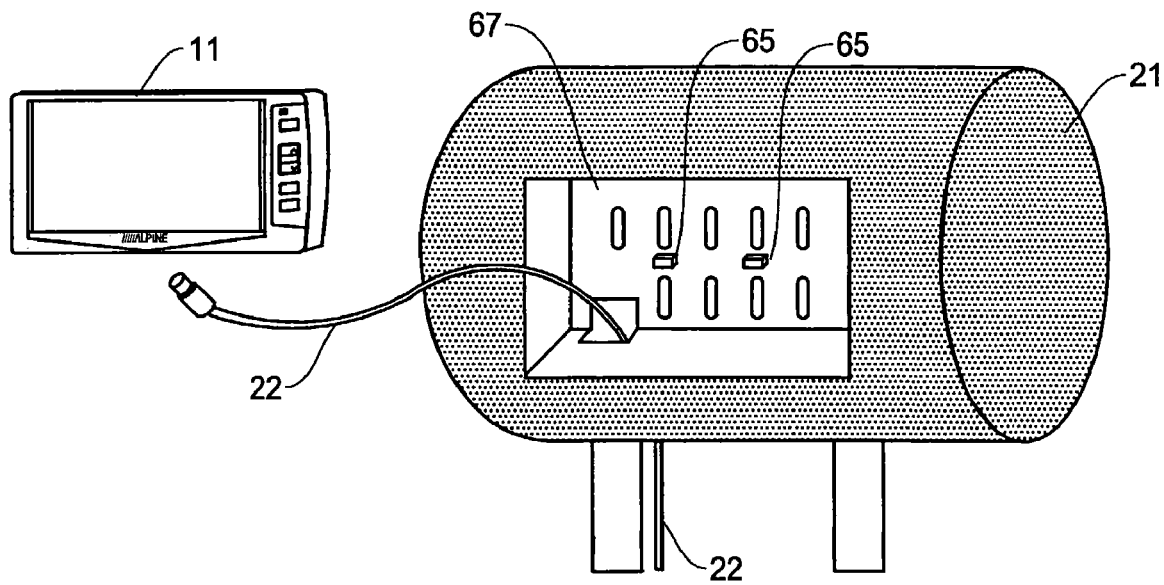
FIGS. 6A-6B are schematic diagrams showing a second embodiment of the present invention where a mechanical switch is installed to release the brake interlock function.
Figure 6B:
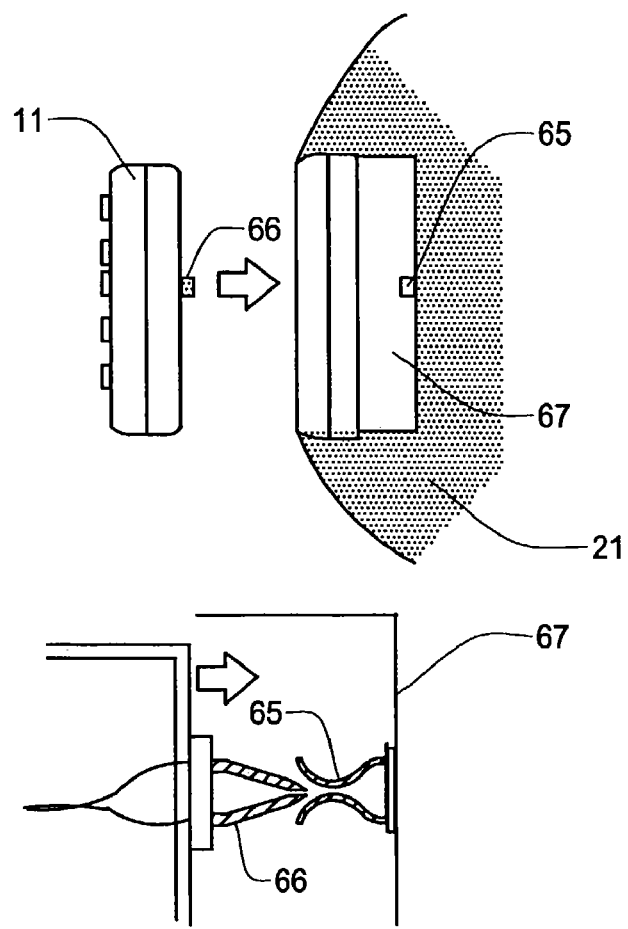

FIGS. 6A-6B show the second embodiment of the present invention where mechanical switches are attached to the back panel of the display unit 11. The structure of mechanical switches are different from the mechanical switches 61 in FIGS. 5A-5B. The mechanical switch in this case is a connector which is formed of a pin 66 and a receptacle 65. The receptacles 65 are attached to an inner back wall of the display compartment 67 and the pin 66 is attached to the back panel of the display unit 11 as shown in FIGS. 6A-6B.

FIG. 6B further shows a cross sectional side view of the display unit 11 and the display compartment 67. The receptacle 65 is both horizontally and vertically aligned such that the receptacle 65 contacts the pin 66 when the display unit 11 is installed in the display compartment 67. Namely, as shown in the bottom of FIG. 6B, when the display unit 11 is installed in the display compartment 67, a pair of pins 66 contact each other as the pins 66 are pressed in the receptacle 65. The switch is electrically closed (ON) when the pins mechanically contact each other, and the display unit 11 generates a release signal. The display unit 11 sends the release signal to the AV interface 47 (FIG. 4a) through the cable 22. Thus, the brake interlock function is released for the display unit 11.

Figure 7A:
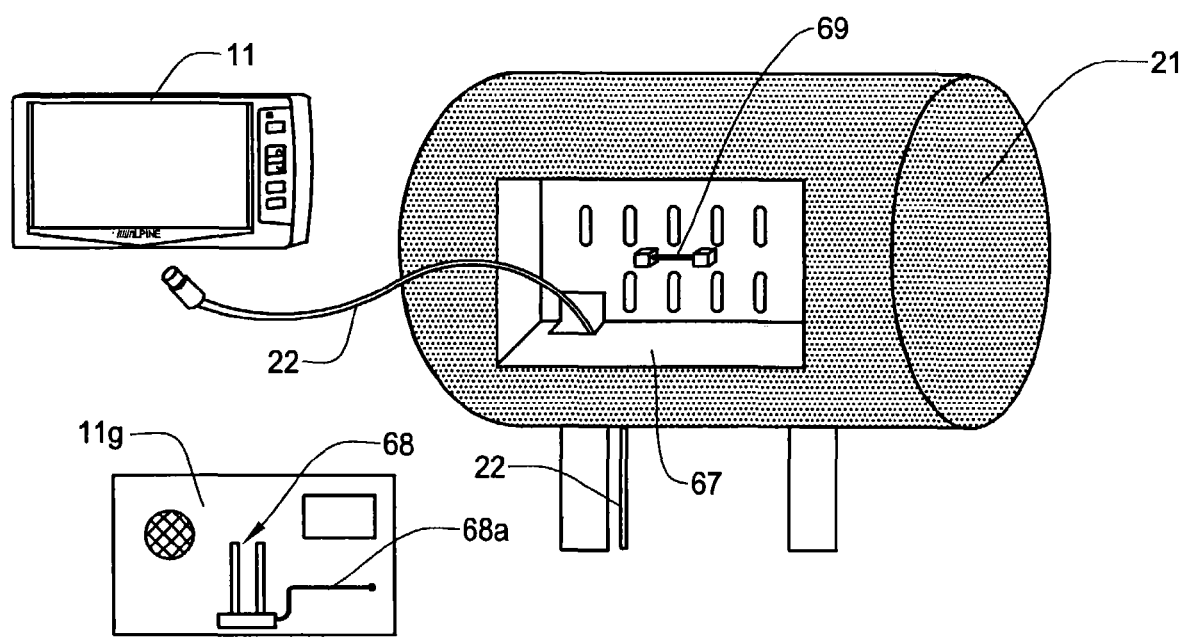
FIGS. 7A-7B are schematic diagrams showing a third embodiment of the present invention where a mechanical switch is installed to release the brake interlock function.
Figure 7B:
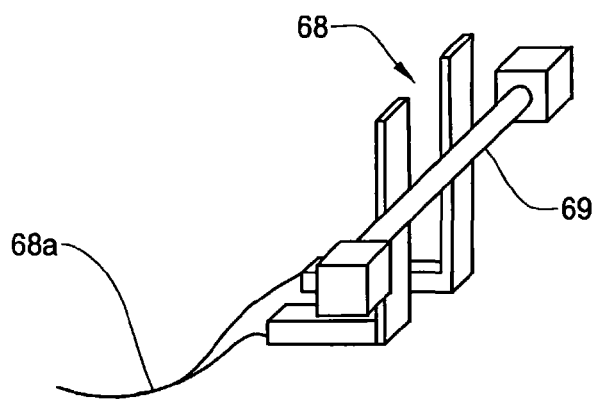

FIGS. 7A-7B show the third embodiment of the present invention where mechanical switches are attached to the back panel of the display unit 11. As shown in FIG. 7A, two terminals 68 and a rod 69 made of conductive material form a mechanical switch. Each terminal 68 is attached on the back panel 11g of the display unit 11 as shown in the FIG. 7A. On the other hand, the rod 69 is attached to the inner back wall of the display compartment 67. The terminals 68 are horizontally and vertically aligned such that the terminals 68 are electrically shorted by the rod 69 when the display unit 11 is installed in the display compartment 67. The terminals 68 have wires 68a to transmit a signal to the display unit 11 which sends a release signal to the AV interface unit 47 through the cable 22. As a result, the drive interlock function is released for the display unit 11.

Figure 8A:
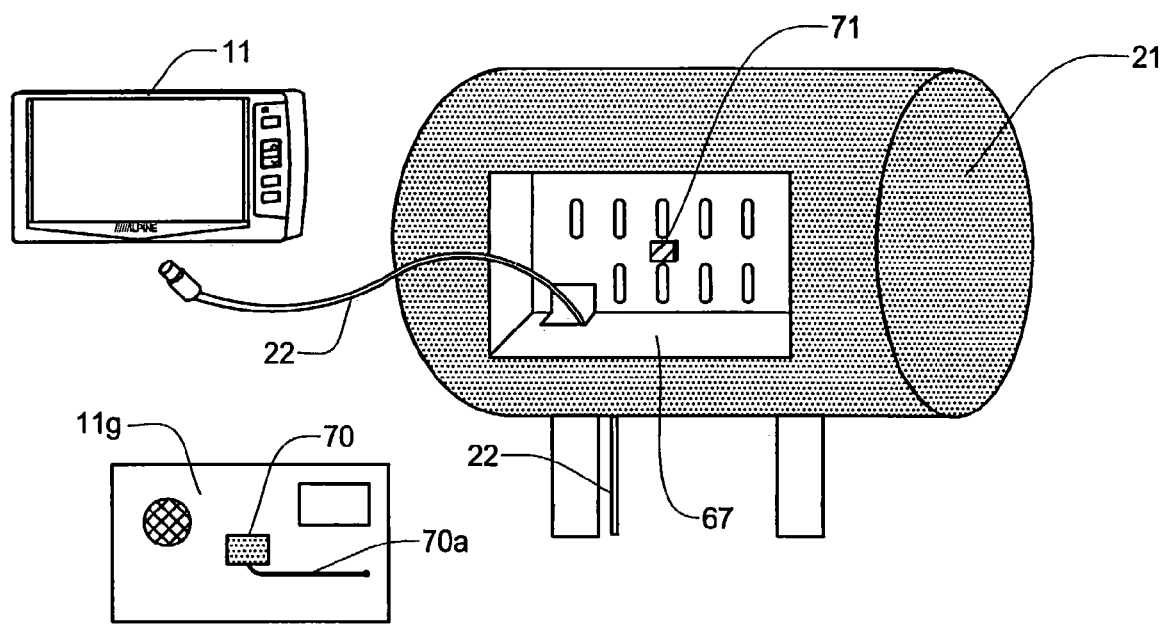
FIGS. 8A-8B are schematic diagrams showing a fourth embodiment of the present invention where a magnetic sensor is installed to release the brake interlock function.
Figure 8B:
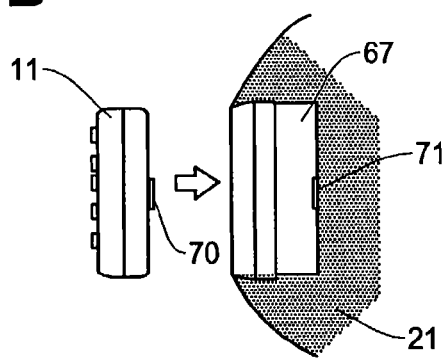

FIGS. 8A-8B show the fourth embodiment of the present invention where a magnetic sensor 70 is attached to the back panel of the display unit 11. The magnetic sensor 70 is placed on the back panel 11g of the display unit 11 while a permanent magnet 71 is attached on an inner back wall of the display compartment 67. The magnetic sensor 70 is wired to the display unit 11 to transmit a sensor signal. The magnet 71 is typically covered with plastic film or other coating for mechanical protection.

Figure 9A:
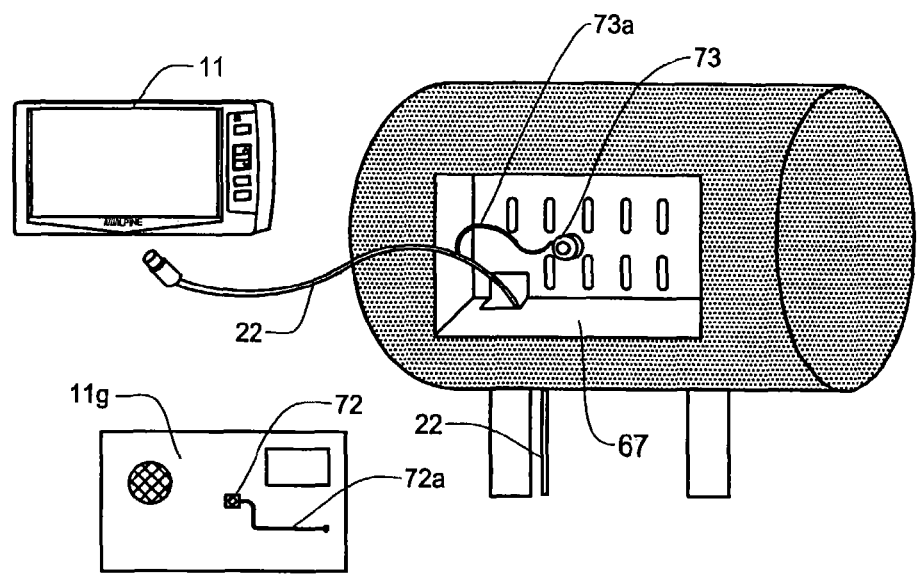
FIGS. 9A-9B are schematic diagrams showing a fifth embodiment of the present invention where an optical sensor is installed to release the brake interlock function.
Figure 9B:
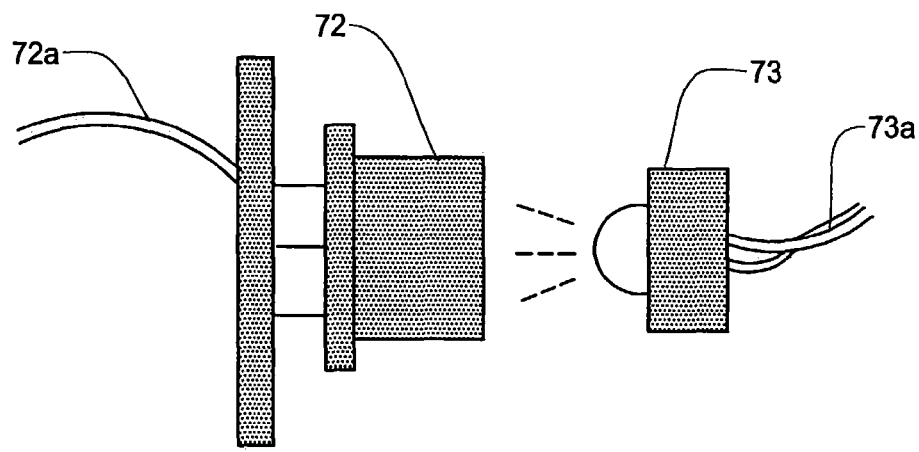

The position of the magnetic sensor 70 and the permanent magnet 71 is adjusted such that the magnetic sensor 70 detects the magnetic field of the permanent magnet 71 when the display unit 11 is inserted into the display compartment 67. In this embodiment, the magnetic sensor 70 does not need to mechanically contact the magnet 71 because the magnetic sensor 70 only needs to detect the magnetic field produced by the permanent magnet 71. When the magnetic sensor 70 detects the magnetic field, a detection signal is sent to the display unit 11 via wire 70a, then a release signal is generated in the display unit 11 and is sent to the AV interface unit. In this embodiment, it is apparent that the positions of the magnetic sensor 70 and the permanent magnet 71 can be reversed:

FIGS. 9A-9B show the fifth embodiment of the present invention where an optical sensor 72 is attached to the back panel of the display unit 11. As shown in FIG. 9A, on the back panel 11g of the display unit 11, a photo diode (photo transistor) 72 is provided as an optical sensor. An optical source such as an LED (Light Emitting Diode) 73 is placed on the inner back wall of the display compartment 67. The wire 73a provides power for the LED 73 through the wire 22.

The positions of the optical sensor 72 and the optical source 73 are adjusted such that the photo sensor 72 can detect the light energy from the optical source 73 effectively. Thus, when the display unit 11 is inserted into the display compartment 67, the distance between the photo transistor and the LED becomes short enough for the optical sensor 72 to receive the light energy. As a result, the optical sensor 72 sends a detection signal via wire 72a to the display unit 11 which sends a release signal to the AV interface unit. As a result, the drive interlock function is released for the display unit 11.

As one of variations of the fifth embodiment, an optical sensor may be placed on the inner back wall of the display compartment 67 and an optical source may be attached to the back panel of the display unit 11. In such an arrangement, the release signal is produced by the photo transistor on the inner back wall of the display compartment 67 and is directly sent to the AV interface unit to release the brake interlock function.

In the foregoing example, the release signal is sent to the AV interface unit to release the brake interlock function, however, there are many other ways to enable the display unit. For example, instead of sending the release signal to the AV interface unit, the release signal can be directly used by the display unit as an activation signal for the display unit. As noted above, depending on the actual design, the AV interface unit can be formed within the housing of the display unit.

The foregoing descriptions concerning FIGS. 6-9 only show the case where the releasing apparatuses (such as switches) are placed on the back panel of the display unit and on the inner back wall of the display compartment. However, as in the example such as shown in FIGS. 5A-5B, the releasing apparatus in FIGS. 6-9 can be installed on the side of the display unit or the inner side wall of the display compartment. The releasing apparatus in FIGS. 6-9 can also be formed within the display unit or the display compartment so as not to be easily broken or shown to the user. Further, it is apparent that the positions of the components forming the mechanical switches in the embodiments of FIGS. 5A-5B, 6A-6B and 7A-7B can be reversed.

As has been described above, according to the present invention, in any embodiments for releasing the brake interlock function, the conventional accessary cable is not used. Moreover, a user can easily install the display unit in the rear of the front seat for passengers in the rear seat and the brake interlock function is automatically released by the installation of the display unit. Since the display compartment for receiving the display unit therein is designed only for the attachment to the rear of the front seat, the user can release the brake interlock function without violating the traffic regulations.

Although the invention is described herein with reference to the preferred embodiments, one skilled in the art will readily appreciate that various modifications and variations may be made without departing from the spirit and the scope of the present invention. Such modifications and variations are considered to be within the purview and scope of the appended claims and their equivalents.

What is claimed is:

1. An apparatus for releasing a brake interlock function of a vehicle audio/video system, comprising:
   a display unit for the vehicle audio/video system for displaying images;
   a display compartment for receiving the display unit therein; and
   a release device attached to the display unit and the display compartment for producing a release signal when the display unit is installed in the display compartment;

wherein the brake interlock function is released by the release signal when the display compartment having the display unit is mounted on a rear of a front or middle seat, thereby enabling the display unit; and wherein the release device includes a switch which is formed within the display compartment mounted on the front or middle seat when the display unit is installed in the display compartment.

2. An apparatus for releasing a brake interlock function as defined in claim 1, wherein the rear of the front or middle seat is a rear of a headrest of the front seat or middle seat of the vehicle, and wherein the display compartment is so configured to be fit solely with a recess formed on the rear of the headrest.

3. An apparatus for releasing a brake interlock function as defined in claim 1, wherein the rear of the front or middle seat is a rear of a seat back of the front seat or middle seat of the vehicle, and wherein the display compartment is so configured to be fit solely with a recess formed on the seat back of the front or middle seat.

4. An apparatus for releasing a brake interlock function as defined in claim 1, wherein the switch in the release device is a mechanical switch which is pressed by an inner wall of the display compartment when the display unit is installed in the display compartment, thereby generating the release signal.

5. An apparatus for releasing a brake interlock function as defined in claim 1, wherein the switch in the release device is a mechanical switch which works as a connector where a pin of the connector is inserted in a receptacle of the connector when the display unit is installed in the compartment, thereby generating the release signal.

6. An apparatus for releasing a brake interlock function as defined in claim 1, wherein the switch in the release device is a mechanical switch comprised of two electrical terminals and a rod for electrically shorting the two terminals when the display unit is installed in the display compartment, thereby generating the release signal, where the two terminals are provided on the display unit, and the rod is placed on an inner wall of the display compartment, or vice versa.

7. An apparatus for releasing a brake interlock function as defined in claim 1, wherein the switch in the release device is comprised of a magnetic sensor and a permanent magnet, and the magnetic sensor detects a magnetic field produced by the permanent magnet when the display unit is installed in the display compartment, thereby generating the release signal, where the magnetic sensor is provided on the display unit and the permanent magnet is provided on an inner wall of the display compartment, or vice versa.

8. An apparatus for releasing a brake interlock function as defined in claim 1, wherein the switch in the release device is comprised of an optical sensor and an optical source, and the optical sensor detects light energy produced by the optical source when the display unit is installed in the display compartment, thereby generating the release signal, where the optical sensor is provided on the display unit and the optical source is provided on an inner wall of the display compartment, or vice versa.

9. An apparatus for releasing a brake interlock function as defined in claim 1, wherein the display unit displays either the images from an audio/video source or a navigation status from a navigation system where a function of the navigation system is unaffected by the block interlock function.

10. An apparatus for releasing a brake interlock function of a vehicle audio/video system, comprising:

a display unit for the vehicle audio/video system for displaying images;

an interface unit for interfacing between the display unit and an audio/video source;

a display compartment for receiving the display unit therein;

a release device attached to the display unit and the display compartment for producing a release signal which is sent to the interface unit when the display unit is installed in the display compartment;

wherein the brake interlock function is released by the release signal when the display compartment having the display unit is mounted on a rear of a front or middle seat, thereby enabling the display unit; and wherein the release device includes a switch which is formed within the display compartment mounted on the front or middle seat when the display unit is installed in the display compartment.

11. A method for releasing a brake interlock function of a vehicle audio/video system, comprising the following steps of:

providing a display unit for the vehicle audio/video system for displaying images;

receiving the display unit in a display compartment;

producing a release signal by a release device attached to the display unit and the display compartment when the display unit is received in the display compartment; and mounting the display compartment having the display unit on a rear of a front seat or middle seat of the vehicle:

wherein the brake interlock function is released by the release signal when the display compartment having the display unit is mounted on the rear of the seat, thereby enabling the display unit; and wherein the release device includes a switch which is formed within the display compartment mounted on the front or middle seat when the display unit is installed in the display compartment.

12. A method for releasing a brake interlock function as defined in claim 11, wherein the step of mounting the display compartment includes a step of inserting the display compartment in a recess formed on a rear of a headrest of the front seat or middle seat of the vehicle.

13. A method for releasing a brake interlock function as defined in claim 11, wherein the step of mounting the display compartment includes a step of inserting the display compartment in a recess formed on a rear of a seat back of the front seat or middle seat of the vehicle.

14. A method for releasing a brake interlock function as defined in claim 11, wherein the step of producing the release signal includes a step of forming the switch which is a mechanical switch which is pressed by an inner wall of the display compartment when the display unit is installed in the display compartment, thereby generating the release signal.

15. A method for releasing a brake interlock function as defined in claim 11, wherein the step of producing the release signal includes a step of forming the switch which is a mechanical switch which works as a connector where a pin of the connector is inserted in a receptacle of the connector when the display unit is installed in the display compartment, thereby generating the release signal.

16. A method for releasing a brake interlock function as defined in claim 11, wherein the step of producing the release signal includes a step of forming the switch which is a mechanical switch comprised of two electrical terminals and a rod for electrically shorting the two terminals when the display unit is installed in the display compartment, thereby generating the release signal, where the two terminals are provided on the display unit, and the rod is placed on an inner wall of the display compartment, or vice versa.

17. A method for releasing a brake interlock function as defined in claim 11, wherein the step of producing the release signal includes a step of forming the switch which is comprised of a magnetic sensor and a permanent magnet, and the magnetic sensor detects a magnetic field produced by the permanent magnet when the display unit is installed in the display compartment, thereby generating the release signal, and wherein the step of providing the magnetic sensor and the permanent magnet includes a step of providing the magnetic sensor on the display unit and providing the permanent magnet on an inner wall of the display compartment, or vice versa.

18. A method for releasing a brake interlock function as defined in claim 11, wherein the step of producing the release signal includes a step of forming the switch which is comprised of an optical sensor and an optical source, and the optical sensor detects light energy produced by the optical source when the display unit is installed in the display compartment, thereby generating the release signal, and wherein the step of providing the optical sensor and the optical source includes a step of providing the optical sensor on the display unit and providing the optical source on an inner wall of the display compartment, or vice versa.

* * * * *